US008578495B2

(12) United States Patent
Burtscher

(10) Patent No.: US 8,578,495 B2
(45) Date of Patent: *Nov. 5, 2013

(54) SYSTEM AND METHOD FOR ANALYZING PACKED FILES

(75) Inventor: Michael Burtscher, Longmont, CO (US)

(73) Assignee: Webroot Inc., Broomfield, CO (US)

( * ) Notice: Subject to any disclaimer, the term of this patent is extended or adjusted under 35 U.S.C. 154(b) by 836 days.

This patent is subject to a terminal disclaimer.

(21) Appl. No.: 11/460,032

(22) Filed: Jul. 26, 2006

(65) Prior Publication Data

US 2008/0028388 A1 Jan. 31, 2008

(51) Int. Cl.
H04L 29/06 (2006.01)

(52) U.S. Cl.
USPC .................................. 726/24; 726/3; 713/188

(58) Field of Classification Search
USPC ....................... 726/22, 24; 719/331–332, 310
See application file for complete search history.

(56) References Cited

U.S. PATENT DOCUMENTS

| 5,623,600 | A |   | 4/1997  | Ji et al. |
| 5,920,696 | A |   | 7/1999  | Brandt et al. |
| 5,951,698 | A |   | 9/1999  | Chen et al. |
| 5,974,549 | A | * | 10/1999 | Golan .............................. 726/23 |
| 6,069,628 | A |   | 5/2000  | Farry et al. |
| 6,073,241 | A |   | 6/2000  | Rosenberg et al. |
| 6,092,194 | A |   | 7/2000  | Touboul |
| 6,154,844 | A |   | 11/2000 | Touboul |
| 6,167,520 | A |   | 12/2000 | Touboul |
| 6,310,630 | B1|   | 10/2001 | Kulkarni et al. |
| 6,397,264 | B1|   | 5/2002  | Stasnick et al. |
| 6,405,316 | B1|   | 6/2002  | Krishnan et al. |
| 6,460,060 | B1|   | 10/2002 | Maddalozzo, Jr. et al. |
| 6,480,962 | B1|   | 11/2002 | Touboul |
| 6,535,931 | B1|   | 3/2003  | Celi, Jr. |
| 6,611,878 | B2|   | 8/2003  | De Armas et al. |
| 6,633,835 | B1|   | 10/2003 | Moran et al. |
| 6,667,751 | B1|   | 12/2003 | Wynn et al. |
| 6,701,441 | B1|   | 3/2004  | Balasubramaniam et al. |
| 6,772,345 | B1|   | 8/2004  | Shetty |

(Continued)

FOREIGN PATENT DOCUMENTS

WO PCT/US2007/067082 11/2007

OTHER PUBLICATIONS

Volynkin, Evaluation of Run time detection of self replication in binary executable malware, 2006, IEEE, 184-191.*

(Continued)

Primary Examiner — Edan Orgad
Assistant Examiner — Brian Olion
(74) Attorney, Agent, or Firm — Sheridan Ross P.C.

(57) ABSTRACT

A system and method for analyzing executable files on a computer is described. The method in one embodiment includes initiating, with an operating system of the computer, execution of a loader-process; loading, using the loader-process, code of a first executable file into an executable-memory of the computer; and executing the code of the first executable file, wherein the code of the first executable file unpacks other packed-code to generate unpacked code. In addition, the loader-process executes the unpacked code and stops execution of the unpacked code in response to the unpacked code attempting to make a potentially dangerous system call. The unpacked code is analyzed, in response to the unpacked code attempting to make the potentially dangerous system call, to assess whether the first executable file is a pestware file.

19 Claims, 3 Drawing Sheets

(56) References Cited

U.S. PATENT DOCUMENTS

| | | | |
|---|---|---|---|
| 6,785,732 B1 | 8/2004 | Bates et al. | |
| 6,804,780 B1 | 10/2004 | Touboul | |
| 6,813,711 B1 | 11/2004 | Dimenstein | |
| 6,829,654 B1 | 12/2004 | Jungek | |
| 6,910,134 B1 | 6/2005 | Maher et al. | |
| 6,965,968 B1 | 11/2005 | Touboul | |
| 7,058,822 B2 | 6/2006 | Edery et al. | |
| 7,107,617 B2 | 9/2006 | Hursey et al. | |
| 7,349,931 B2 | 3/2008 | Horne | |
| 7,376,970 B2* | 5/2008 | Marinescu | 726/22 |
| 2002/0083334 A1* | 6/2002 | Rogers et al. | 713/200 |
| 2002/0162015 A1 | 10/2002 | Tang | |
| 2002/0166063 A1 | 11/2002 | Lachman et al. | |
| 2003/0065943 A1 | 4/2003 | Geis et al. | |
| 2003/0074581 A1 | 4/2003 | Hursey et al. | |
| 2003/0101381 A1 | 5/2003 | Mateev et al. | |
| 2003/0115479 A1* | 6/2003 | Edwards et al. | 713/200 |
| 2003/0159070 A1 | 8/2003 | Mayer et al. | |
| 2003/0212906 A1 | 11/2003 | Arnold | |
| 2003/0217287 A1 | 11/2003 | Kruglenko | |
| 2004/0030914 A1 | 2/2004 | Kelley et al. | |
| 2004/0034794 A1 | 2/2004 | Mayer et al. | |
| 2004/0064736 A1 | 4/2004 | Obrecht et al. | |
| 2004/0080529 A1 | 4/2004 | Wojcik | |
| 2004/0143763 A1 | 7/2004 | Radatti | |
| 2004/0187023 A1 | 9/2004 | Alagna et al. | |
| 2004/0225877 A1 | 11/2004 | Huang | |
| 2005/0038697 A1 | 2/2005 | Aaron | |
| 2005/0138433 A1 | 6/2005 | Linetsky | |
| 2005/0149726 A1 | 7/2005 | Joshi et al. | |
| 2005/0154885 A1 | 7/2005 | Viscomi et al. | |
| 2005/0172337 A1 | 8/2005 | Bodorin et al. | |
| 2005/0188272 A1 | 8/2005 | Bodorin | |
| 2005/0257266 A1 | 11/2005 | Cook et al. | |
| 2006/0041942 A1* | 2/2006 | Edwards | 726/26 |
| 2006/0075494 A1 | 4/2006 | Bertman et al. | |
| 2006/0075501 A1 | 4/2006 | Thomas et al. | |
| 2006/0161988 A1 | 7/2006 | Costea et al. | |
| 2006/0236397 A1 | 10/2006 | Horne | |
| 2006/0265761 A1 | 11/2006 | Rochette | |
| 2006/0277183 A1 | 12/2006 | Nichols | |
| 2006/0288416 A1 | 12/2006 | Costea et al. | |
| 2008/0016339 A1* | 1/2008 | Shukla | 713/164 |

OTHER PUBLICATIONS

Coit, Towards Faster String Matching for Intrusion Detection or Exeeding the Speed of Snort, 2005, IEEE, 368-373.*

Jesse C. Rabek "Detection of Injected, Dynamically Generated, and Obfuscated Malicious Code" ,2003, Massachusetts Institue of Technology.*

Carey Nachenberg "Computer Virus-AntiVirus Coevolution", 1997, Communications of the ACM.*

U.S. Appl. No. 11/460,074, filed Jul. 26, 2006, Michael Burtscher.

Codeguru, Three Ways to Inject Your Code Into Another Process, by Robert Kuster, Aug. 4, 2003, 22 pgs.

Codeguru, Managing Low-Level Keyboard Hooks With the Windows API for VB Net, by Paul Kimmel, Apr. 18, 2004, 10 pgs.

Codeguru, Hooking the Keyboard, by Anoop Thomas, Dec. 13, 2001, 6 pgs.

Illusive Security, Wolves in Sheep's Clothing: malicious DLLs Injected Into trusted Host Applications, Author Unknown, http://home.arcor.de/scheinsicherheit/dll.htm 13 pgs.

DevX.com, Intercepting Systems API Calls, by Seung-Woo Kim, May 13, 2004, 6 pgs.

Microsoft.com, How to Subclass a Window in Windows 95, Article ID 125680, Jul. 11, 2005, 2 pgs.

MSDN, Win32 Hooks by Kyle Marsh, Jul. 29, 1993, 15 pgs.

PCT Search Report, PCT/US05/34874, Jul. 5, 2006, 7 Pages.

Yurcik, William et al., A Planning Framework for Implementing Virtual Private Networks, Jun. 2001, IT Pro, IEEE, pp. 41-44.

Yi-Min Wang et al.; "Detecting Stealth Software with Strider Ghostbuster" Dependable Systems and Networks, 2005, DSN 2005, Proceedings, International Conference on Yokohama, Japan 28-0 Jun. 2005, Piscatay, NJ, USA, IEE, Jun. 28, 2005; pp. 368-377; XP010817813; ISBN: 0-7695-2282-3.

International Search Report and Written Opinion for International (PCT) Patent Application No. PCT/US2006/041798 mailed Dec. 4, 2007, 4 pages.

Schmid et al., "Preventing the execution of unauthorized Win32 applications," Proceedings of the DARPA Information Survivability Conference & Exposition II (DISCEX '01), 2001, vol. 2, pp. 175-183.

Vasudevan et al., "SPiKE: Engineering Malware Analysis Tools using Unobtrusive Binary-Instrumentation," Proceedings of the 29th Australasian Computer Science Conference (ACSC 2006)—vol. 48, 2006, 10 pages.

Official Action for U.S. Appl. No. 11/460,074 mailed Aug. 19, 2009, 22 pages.

Official Action for U.S. Appl. No. 11/460,074 mailed Mar. 16, 2010, 21 pages.

* cited by examiner

SYSTEM AND METHOD FOR ANALYZING PACKED FILES

RELATED APPLICATIONS

The present application is related to commonly owned and assigned application Ser. No. 11/460,074, entitled SYSTEM AND METHOD FOR LOADING AND ANALYZING FILES, filed herewith, which is incorporated herein by reference.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to computer system management. In particular, but not by way of limitation, the present invention relates to systems and methods for controlling pestware or malware.

BACKGROUND OF THE INVENTION

Personal computers and business computers are continually attacked by trojans, spyware, and adware, collectively referred to as "malware" or "pestware." These types of programs generally act to gather information about a person or organization—often without the person or organization's knowledge. Some pestware is highly malicious. Other pestware is non-malicious but may cause issues with privacy or system performance. And yet other pestware is actual beneficial or wanted by the user. Wanted pestware is sometimes not characterized as "pestware" or "spyware." But, unless specified otherwise, "pestware" as used herein refers to any program that collects and/or reports information about a person or an organization and any "watcher processes" related to the pestware.

Software is available to detect and remove pestware by scanning a system for files stored in a data storage device (e.g., disk) on a file by file basis and comparing information from each of the files with known pestware definitions. Problematically, generators of pestware are obfuscating pestware files (e.g., by encrypting and/or compressing them) so as to create pestware files that, at the very least, are very difficult to identify by comparing them with known pestware definitions. As a consequence, existing software often leaves obfuscated files in the system because of uncertainty whether the file is associated with a desired application. Accordingly, current software is not always able to scan and remove pestware in a convenient manner and will most certainly not be satisfactory in the future.

Although present devices are functional, they are not sufficiently accurate or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for analyzing executable files on a computer. The method in one embodiment includes initiating, with an operating system of the computer, execution of a loader-process; loading, using the loader-process, code of a first executable file into an executable-memory of the computer; and executing the code of the first executable file, wherein the code of the first executable file unpacks other packed-code to generate unpacked code. The unpacked code is then analyzed to assess whether the first executable file is a pestware file.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
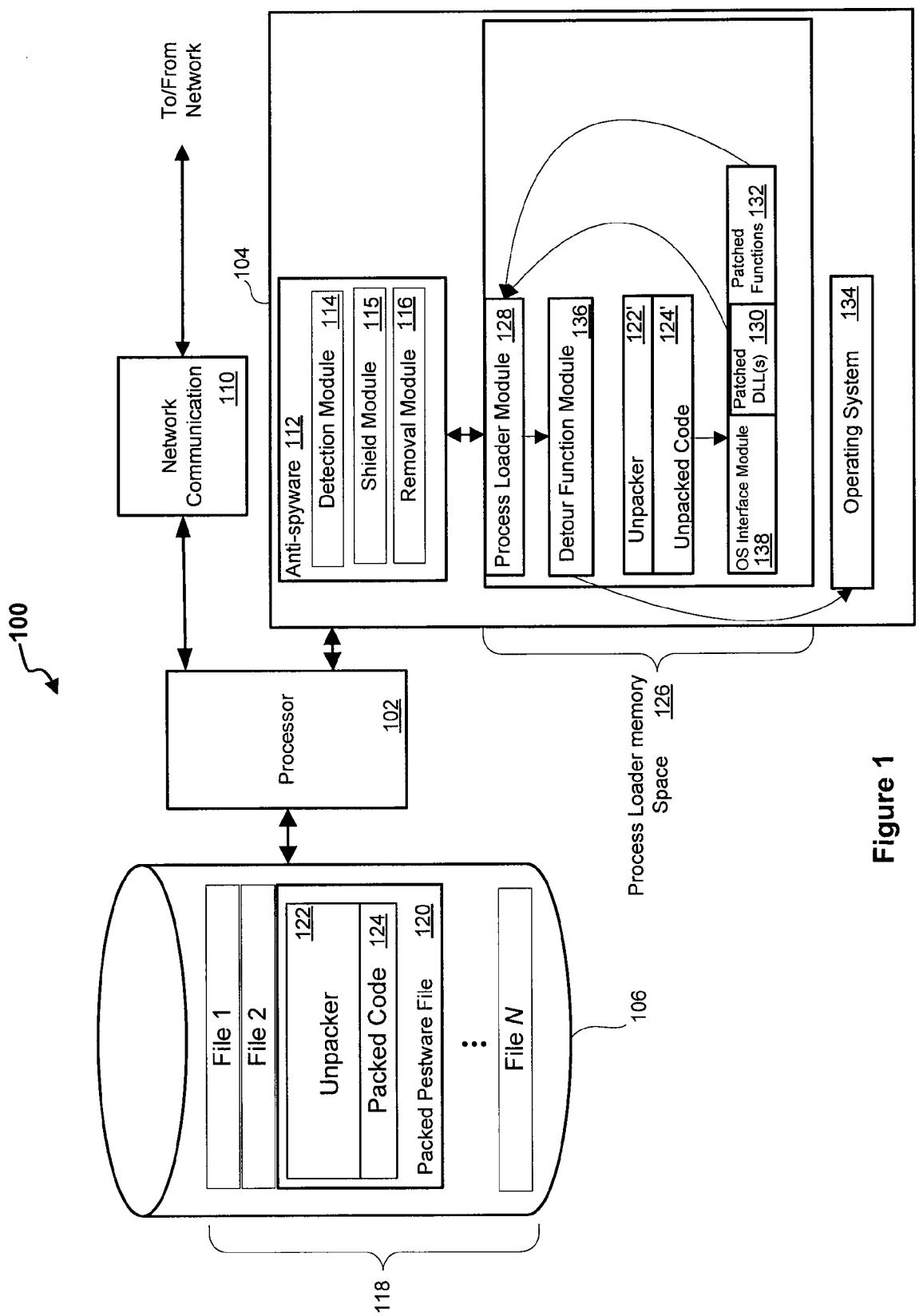
FIG. 1 illustrates a block diagram of a protected computer in accordance with one implementation of the present invention.

Referring now to the drawings, where like or similar elements are designated with identical reference numerals throughout the several views, and referring in particular to FIG. 1, it illustrates a block diagram 100 of a protected computer/system in accordance with one implementation of the present invention. The term "protected computer" is used herein to refer to any type of computer system, including personal computers, handheld computers, servers, firewalls, etc. This implementation includes a processor 102 coupled to memory 104 (e.g., random access memory (RAM)), a file storage device 106, and network communication 110.

As shown, the storage device 106 provides storage for a collection of N files 118 including a packed pestware file 120 that includes an unpacker portion 122 and a packed code portion 124. The storage device 106 is described herein in several implementations as hard disk drive for convenience, but this is certainly not required, and one of ordinary skill in the art will recognize that other storage media may be utilized without departing from the scope of the present invention. In addition, one of ordinary skill in the art will recognize that the storage device 106, which is depicted for convenience as a single storage device, may be realized by multiple (e.g., distributed) storage devices.

As shown, an anti-spyware application 112 includes a detection module 114, a shield module 115 and a removal module 116, which are implemented in software and are executed from the memory 104 by the processor 102. In addition, a process-loader memory space 126 is shown that includes a process loader module 128 in communication with a detour function 136, an unpacker 122' corresponding to the unpacker portion 122 and unpacked code 124' corresponding to the packed code 124. Also depicted in the process-loader memory space is an operating system interface 138, which includes patched dynamic link libraries (DLLS) 130 and patched functions 132 that are in communication with the unpacked code 124'. In addition, the process loader module 128 is shown in communication with an operating system 134 via the detour function 136.

The anti-spyware application 112 and process loader module 128 can be configured to operate on personal computers (e.g., handheld, notebook or desktop), servers, firewalls or any device capable of processing instructions embodied in executable code. Moreover, one of ordinary skill in the art will recognize that alternative embodiments, which implement one or more components (e.g., the anti-spyware 112) in hardware, are well within the scope of the present invention. It should be recognized that the arrangement of the anti-spyware application 112 and the loader module 128 is logical and not meant to be an actual hardware diagram. Thus, the components can be combined or further separated in an actual implementation. Moreover, the construction of each individual component in light of the teaching herein is well-known to those of skill in the art.

In accordance with several embodiments of the present invention, the detection module 114 is configured to scan code (e.g., unpacked code) that is loaded by the loader module 128 to determine whether the code is potentially pestware code. In general, once the loader 128 has loaded code (e.g., executable code) the detection module 114 may utilize one or more techniques to determine whether the loaded code is pestware-related. As an example, selected portions of the code may be scanned at one or more offsets from a reference point in the code to determine whether the code is pestware-related. Application Ser. No. 11/105,978, filed Apr. 14, 2005 entitled System and Method for Scanning Obfuscated Files for Pestware, which is incorporated herein by reference, includes additional information relative to offset scanning techniques.

The loader module 128 in this embodiment is configured to load and enable at least a portion of the code in selected ones of the N files 118 to be executed while preventing the executed code from carrying out undesirable activity on the computer 100. Beneficially, the loader module 128 enables files to be loaded, executed (e.g., at least in part), analyzed, and removed from memory in substantially less time than would be required if the operating system 134 of the computer were used to load and execute the same files. This time savings is due, at least in part, to one or more steps typically initiated by the operating system 134 that the loader module 128 avoids. For example, the operating system 134 may create a new virtual address space each time a file is loaded and perform one or more security checks. And when terminating code, the operating system 134 may have to remove memory mappings, collect and free resources as well as carry out other cleanup operations.

Although the time associated with the steps that the loader module 128 avoids may not be noticeable when just a few files are loaded, when thousands of files are serially loaded and terminated, the loader module 128 may save several minutes relative to using the operating system 134 to load files. Notably, operation of the loader module 128 is described herein with reference to embodiments where the loader 128 is loading packed code (e.g., the packed pestware file 120), but the loader module 128 in several embodiments is generally capable of loading many types of files including executable files (e.g., files organized in the Portable Executable (PE) format) and non-executable files.

Although the loader module 128 avoids one or more time consuming steps when loading and/or terminating a process, the loader module 128 may also carry out many of the same functions that are ordinarily carried out by the operating system 134. In connection with loading and executing files, for example, the loader module 128 in many variations is configured to access headers of a file and map the file from the storage device 106 to memory 104 as well as determine which DLLs the file wants to access.

In addition, in many embodiments the loader module 128 also fills an import address table of each loaded process. For example, the loader module 128 may access DLLs (e.g., kernel32), retrieve information about where functions are implemented, and then place the addresses of the functions into the appropriate fields in the import address table of the loaded code. In many variations, however, the loader module 128 places addresses of functions, which are internal to the loader module 128, within the import address table of the loaded process so that when a loaded process attempts to access a function, it is routed to code associated with the loader module 128 (e.g., the loader module 128 itself or other code associated with the anti-spyware application 112) instead of the operating system 134.

Figure 2:
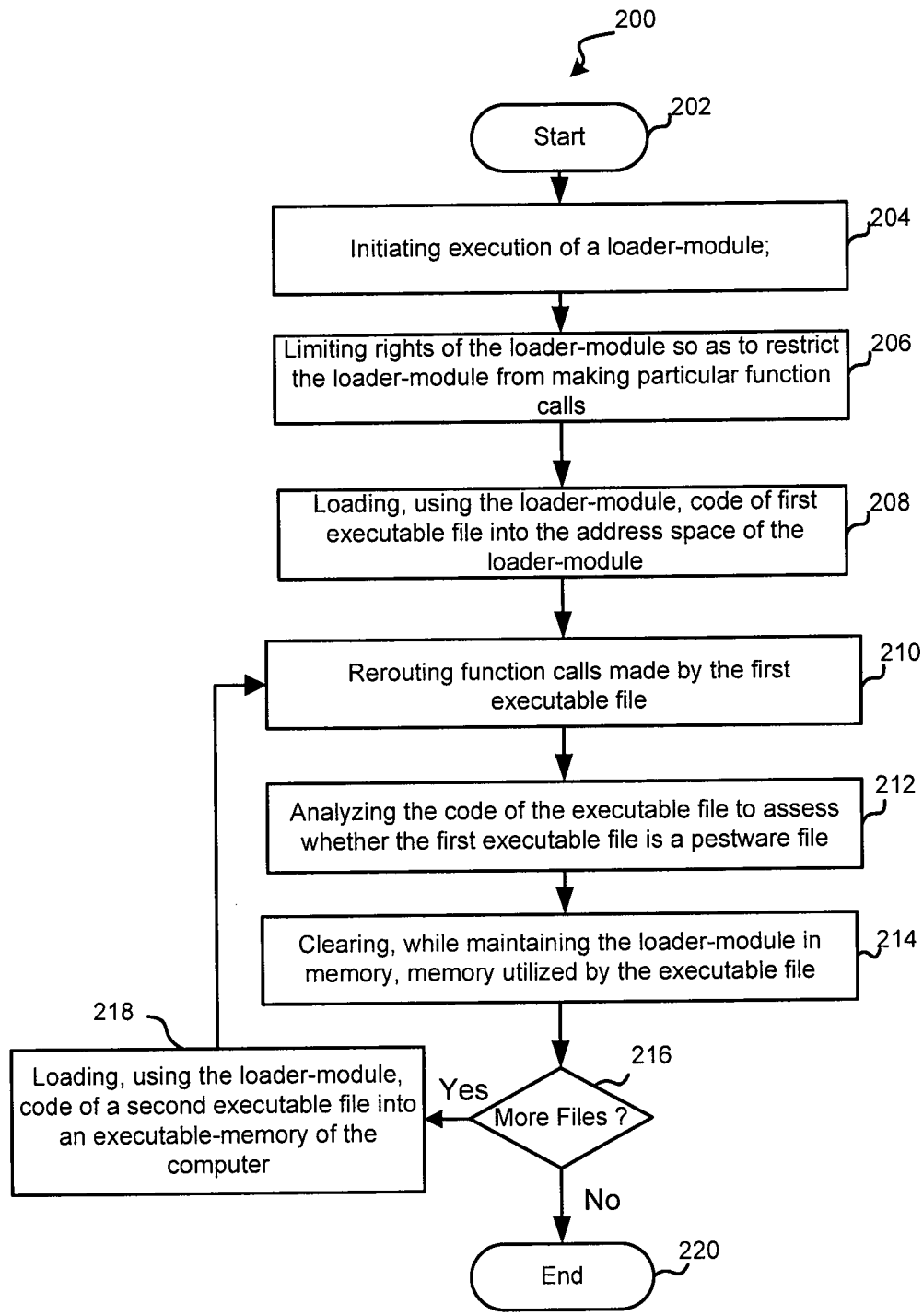
FIG. 2 is a flowchart of one method for identifying pestware in accordance with an embodiment of the present invention.

As discussed further herein with reference to FIG. 2, when the loader module 128 is loaded, in many embodiments it is restricted in terms of the activities it may perform. For example, the anti-spyware application 112 may limit the activities (e.g., function calls) of the loader module 128 by passing activity-limiting security tokens to the operating system 134 in connection with a CreateProcess call that is made to launch the loader module 128. In this way, the operating system 134 limits rights of the loader module 128, and hence, helps to prevent processes (e.g., potential pestware processes) that are loaded and executed by the loader module 128 from causing damage to the computer 100. As an example, the loader module 128 may be allowed to read files, but not allowed to write to files, create other processes or access the network communication module 110.

As discussed above, the loader module 128 may place addresses pointing back to the loader module 128 within an import address table of each of the loaded processes. But loaded processes may also attempt to dynamically obtain access to functions by retrieving information from DLLs (e.g., kernel32) to determine whether a function is exported by the DLLs. As a consequence, as additional security, in addition to patching the import address table of each loaded process, in some variations code associated with the operating system 134 is altered (e.g., by the loader module 128) so that particular functions provided by the operating system 134 are rendered inaccessible.

As depicted in FIG. 1, for example, the loader module 128 enumerates DLLs that have been loaded by the operating system 134 for the loader module 128 and patches an export address table of at least a portion of the enumerated DLLs to create the patched DLLs 130. In the exemplary embodiment depicted in FIG. 1, the DLLs are patched so that the export address tables in the patched DLLs 130 point back to the loader module 128 instead of the functions ordinarily provided by operating system 134. In a WINDOWS-based operating system for example, the loader module 128 may create the patched DLLs 130 depicted in FIG. 1 by patching the Kernel32 DLL and NTDLL.

In addition, the loader module 128 in the exemplary embodiment also patches at least a portion of the actual functions (e.g., potentially dangerous functions such as CreateProcess and OpenRegistry) that the export address table(s) point to so that if a pestware process attempts to access a function directly (e.g., without referring to an export address table), the first few instructions of the function point the pestware process back to the loader module 128.

As a consequence, whether a pestware process loaded by the loader module 128 attempts to look up a location of a function, or directly jumps to a known location of a function, in many instances the pestware process will be routed back to the loader module 128 and a determination may be made (e.g., by the loader module 128 and/or the anti-spyware application 112) whether to stop the pestware process, unload it or refer the pestware process on to the actual function depending upon the type of call the pestware process was attempting to make. Thus, the loader module 128 in this embodiment both increases security (e.g., by limiting access to potentially dangerous functions) and retains a tight management over loaded processes by watching and controlling the activities of the loaded processes.

Also depicted in memory 104 is a detour function 136 that resides at a location in memory that is intended to be unknown to any processes that are loaded by the loader module 128. In general, the detour function 136 in this embodiment enables the loader module 128 to make one or more function calls to carry out its function of loading and executing files. For example, the detour function 136 may include function code associated with a CreateFile so that when the loader module 128 loads a file, the loader module 128 calls the detour function 136 to be routed to the CreateFile functionality.

Although certainly not required, the loader module 128 may be configured to directly access (e.g., without using calls to the operating system 122) the storage device 106 to retrieve information from the N files 118. In addition to substantially increasing the rate at which information is retrieved from the storage device 106, directly accessing the storage device 106 also circumvents particular varieties of pestware (e.g., rootkits), which are known to patch, hook, or replace system calls with versions that hide information about the pestware. Additional information about directly accessing (e.g., without using OS API calls) a storage device and removing locked files is found in U.S. application Ser. No. 11/145,593, entitled "System and Method for Neutralizing Locked Pestware Files," which is incorporated herein by reference in its entirety.

In the exemplary embodiment depicted in FIG. 1, the packed pestware file 120 includes an unpacker portion 122, which when executed, unpacks the packed code 124 so that it may be analyzed by the detection module 114. Although many files are packed merely for purposes of reducing file size and perhaps load times, it has been found that some generators of pestware pack pestware code to render pestware-identification techniques ineffective. Consequently, typical scanning techniques are unable to determine that the packed pestware file 120 is a pestware file.

The packed pestware file 120 may be a pestware file that is obfuscated (e.g., intentionally disguised or hidden) by encryption, packing algorithms (e.g., UPX, Aspack, FSG, PECompact), as well as a file obfuscated by compression techniques; weak encryption (e.g. carrying out XOR operations on the file); proprietary encryption/compression, which may utilize variations of known packing routines; file repackaging, which involves the file re-encrypting/compressing itself after being run (e.g., after the file is run, the file grabs data from the machine or internet then repackages itself and writes its new copy to disk); and separating the file into parts such that the file, in the form of multiple segments, is not executable, but once packaged together becomes an executable file.

While referring to FIG. 1, simultaneous reference will be made to FIG. 2, which is a flowchart 200 depicting a method in accordance with one embodiment. Although reference is made to the embodiment depicted in FIG. 1, it should be recognized that the method depicted in FIG. 2 may be adapted to other embodiments. As shown, execution of the loader module 128 is initiated (Blocks 202, 204), and in many embodiments rights of the loader module 128 are limited so as to restrict the loader module 128 from making particular calls to the operating system (Block 206). As described above, the operating system 134 may be used to limit rights of the loader module 128 when it is initiated.

As shown, once the loader module 128 is initiated, it loads at least a portion of a first file into memory of the computer (e.g., the process-loader memory space 126)(Block 208). In many embodiments, the loader module 128 is prompted by the anti-spyware application 112 to load the first file as part of a scan of the N files 118 stored on the storage device 106. As depicted in FIG. 1, the loader module 128 loads the first file in the process loader memory space 126 that is set up and controlled by the loader module 128.

Once loaded, if the first file is an executable file, the loader module 128 allows code of the first file to execute as a process in the process loader memory 126, but potentially dangerous function calls made by the executing code are rerouted to prevent the code from carrying out potentially dangerous operations (e.g., creating another process or attempting to access the network communication module 110)(Block 210). As discussed, the loader module 128 in many embodiments fills an import address table of each loaded process to route at least some system calls back to the loader module 128.

In addition, as depicted in FIG. 1, if the loaded process accesses the patched DLLs 130, the process may be referred back to the process loader module 128 instead of the intended function. Moreover, if the loaded process attempts to directly access an intended function (e.g., CreateFile) the patched function 132 refers the process back to the loader module 128. It should be recognized that the addresses that the loader module 128 fills into the import address tables, the DLLs 130 and the functions 132 may point to a location outside of the loader module 128 that is within the loader module's 128 address space 126.

As shown in FIG. 2, while code of the first file is loaded in memory, the code is analyzed to assess whether the first file is a potential pestware file (Block 212). In many embodiments, the detection module 114 analyzes the code using one or more pestware detection techniques. For example, the detection module 114 may access a portion of the code (e.g., the first 512 Bytes) and compare a representation of the code (e.g., a message digest or cyclic redundancy check) with pestware definitions or, as discussed above, analyze portions of the code at one or more offsets from a reference point within the code for indicia of pestware.

As shown in FIG. 2, after the loaded process is analyzed, the memory utilized by the loaded process is cleared while maintaining the loader module 128 in memory (Block 212), and if there are more files to analyze (Block 216), then other files are loaded by the loader module 128 (Block 218) and the steps described with reference to Blocks 208 through 214 are repeated for each loaded file until there are no more files to analyze (Blocks 216, 220).

Figure 3:
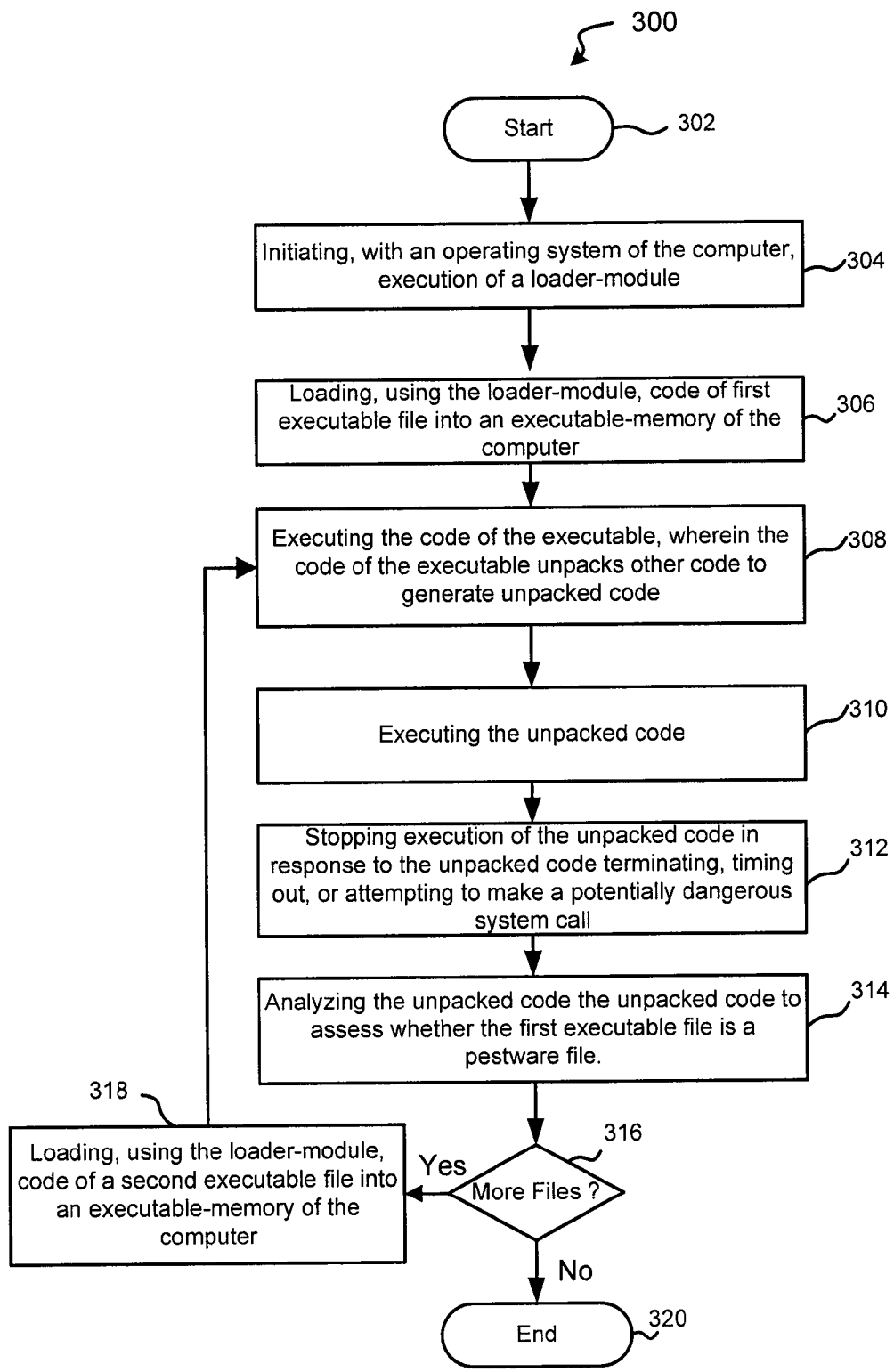
FIG. 3 is a flowchart depicting steps carried out while scanning a potential pestware process in accordance with variations of the present invention.

Referring next to FIG. 3, shown is a flowchart 300 depicting another method in accordance with another embodiment. As shown, in this embodiment a loader module (e.g., the loader module 128) is initially executed using an operating system (e.g., the operating system 134)(Blocks 302, 304). The loader module then loads code of an executable file (e.g., the unpacker 122) into memory of the computer and the code unpacks other code (e.g., the packed code 124) to generate unpacked code (e.g., the unpacked code 124')(Blocks 306, 308).

As depicted in FIG. 3, although not required, in some variations the unpacked code is then allowed to execute (e.g., within the loader memory space 126) until a predetermined event occurs such as the unpacked code attempting to make a potentially dangerous system call, the unpacked code timing out or the unpacked code terminating (Blocks 310, 312). Referring to FIG. 1 as an example, if the unpacked code 124' attempts to locate a function using the patched DLLs 130 or attempts to directly access one of the patched functions 132, the unpacked code 124' is referred back to process loader module 128 (or another function related to the anti-spyware application 112) and depending upon the type of call made, the process loader module 128 either terminates execution of the unpacked code 124', or after a determination is made that the call is likely safe, forwards the call (e.g., via the detour function 136) to the operating system function.

Some types of calls that may prompt the process loader 128 to stop execution of the unpacker 122' and unpacked code 124' are calls to access a registry of the computer, calls to open up network communications and calls to create a new process. A call that the process loader 128 may allow to occur (e.g., by forwarding the call to the operating system 134) is a memory allocation request. If the memory allocation request is for an excessive amount of memory (e.g., a gigabyte), however, the process loader 128 may stop execution of the loaded executable file.

As shown in FIG. 3, the unpacked code 124' is analyzed to assess whether the unpacked code 124' is pestware (Block 314). In some embodiments, the unpacked code is not executed at all and the un-executed unpacked code is analyzed (e.g., by the detection module 114). In other embodiments, however, the unpacked code is analyzed after execution of the unpacked code 124' is terminated. Thus, the loader module 128 in many variations uses the unpacker (e.g., unpacker 122) that accompanies packed code (the packed code 124) to unpack the packed code so that the packed code may be analyzed. As a consequence, the loader module 128 in these variations effectively operates as a universal unpacker that unpacks virtually any type of packed code without having to determine the packing technique used to pack the code and without having to be updated with code to address new packing techniques.

As shown in FIG. 3, if there are more files to analyze (Block 316), then other files are loaded by the loader module 128 (Block 318) and the steps described with reference to Blocks 308 through 314 are repeated for each loaded file until there are no more files to analyze (Blocks 316, 320).

In conclusion, the present invention provides, among other things, a system and method for analyzing packed files. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for analyzing executable files on a computer, comprising:
   initiating, with an operating system of the computer, execution of a loader-process, wherein the loader-process has a memory space controlled by the loader-process;
   loading, using the loader-process, code of a first executable file into the memory space;
   executing the code of the first executable file in the memory space of the loader-process, wherein the code of the first executable file unpacks other packed code to generate unpacked code, the unpacked code including at least one system call;
   analyzing the unpacked code to assess whether the first executable file is a pestware file;
   enumerating dynamic link libraries (DLLS) that have been loaded by the operating system for the loader-process;
   patching at least one export address table of a dynamic link library (DLL) associated with the loader-process so that the patched export address table refers the unpacked code loaded by the loader-process back to code associated with the loader module instead of functions provided by the operating system;
   patching at least a portion of a function that at least one export address table points to so that the patched function refers an attempted access by a pestware process back to the loader-process, wherein at least one or more of a patched function and a patched DLL points to a location outside of the loader-process but within the loader-process's address space;
   executing the unpacked code in the memory space of the loader-process;
   routing, in response to determining the at least one system call is safe, the at least one system call of the unpacked code from the memory space of the loader-process to the operating system of the computer for execution while the unpacked code is executed by the loader-process; and
   clearing the memory space of the loader-process while maintaining the loader-process in a memory of the computer.

2. The method of claim 1, further comprising:
   stopping the execution of the unpacked code in response to a predetermined event.

3. The method of claim 2, wherein the predetermined event is an event selected from the group consisting of: the unpacked code attempting to make a potentially dangerous system call, the unpacked code terminating, and the unpacked code timing out.

4. The method of claim 1, wherein the packed code is packed in accordance with a code-altering technique selected from the group consisting of: encryption, packing algorithms, compression techniques, weak encryption and file repackaging.

5. The method of claim 1, further comprising:
   altering the export address table so the export address table entries point to code of the loader-process that may stop execution of code loaded by the loader-process.

6. The method of claim 1, further comprising:
   altering selected functions so the unpacked code is unable to access code of the selected functions.

7. The method of claim 6, wherein the altering includes placing a jump instruction in the selected functions that points to code of the loader-process so as to prevent a second executable file from accessing the functions.

8. The method of claim 1, further comprising:
implementing a detour function that enables the loader-process to make an API call to load the first executable file.

9. The method of claim 1, wherein the analyzing includes analyzing portions of the unpacked code at offsets from a reference point within the unpacked code.

10. A system for analyzing a packed file stored on a computer comprising:
a processor configured to execute a loader module;
a memory space controlled by the loader module, wherein the loader module cooperating with the memory space performs the following steps:
executes a file unpacker in the memory space of the loader module, wherein the file unpacker, when executed by the loader module, unpacks the packed file to generate unpacked code;
executes the unpacked code in the memory space of the loader module;
assesses a system call from the unpacked code and, if the system call is safe, routes the system call from the unpacked code from the memory space of the loader module to the operating system for execution while the unpacked code is executed by the loader module;
enumerates dynamic link libraries (DLLS) that have been loaded by the operating system for the loader-process;
patches at least one export address table of a dynamic link library (DLL) associated with the loader module so that the patched export address table refers the unpacked code loaded by the loader module back to code associated with the loader module instead of functions provided by the operating system;
patches at least a portion of a function that at least one export address table points to so that the patched function refers an attempted access by a pestware process back to the loader module, wherein at least one or more of a patched function and a patched DLL points to a location outside of the loader-process but within the loader-process's address space; and
clears the memory space of the loader-process while maintaining the loader-process in a memory of the computer; and
a detection module that analyzes the unpacked code after the unpacked code is executed by the loader module.

11. The system of claim 10, wherein the loader module stops execution of the unpacked code in response to the unpacked code attempting to carry out particular instructions while executing.

12. The system of claim 10, wherein the loader module fills in an import address table of the file unpacker.

13. A non-transitory, processor-readable medium including instructions for analyzing executable files on a computer, the instructions comprising instructions for:
initiating, with an operating system of the computer, execution of a loader-process, wherein the loader-process has an address space controlled by the loader process;
loading, using the loader-process, code of a first executable file into the related address space of the loader-process;
executing the code of the first executable file in the address space of the loader-process, wherein the code of the first executable file unpacks other packed-code to generate unpacked code, the unpacked code including at least one system call;
analyzing the unpacked code, in response to the unpacked code attempting to make the at least one system call, to assess whether the first executable file is a pestware file;
enumerating dynamic link libraries (DLLS) that have been loaded by the operating system for the loader-process;
patching at least one export address table of a dynamic link library (DLL) associated with the loader-process so that the patched export address table refers the unpacked code loaded by the loader-process back to code associated with the loader module instead of functions provided by the operating system;
patching at least a portion of a function that at least one export address table points to so that the patched function refers an attempted access by a pestware process back to the loader-process, wherein at least one or more of a patched function and a patched DLL points to a location outside of the loader-process but within the loader-process's address space;
executing the unpacked code in the address space of the loader-process;
routing, in response to determining the at least one system call is safe, the at least on system call of the unpacked code from the address space of the loader-process to the operating system of the computer for execution while the unpacked code is executed by the loader-process; and
clearing the memory space of the loader-process while maintaining the loader-process in a memory of the computer.

14. The non-transitory, processor-readable medium of claim 13, further comprising instructions for stopping execution of the unpacked code in response to a predetermined event selected from the group consisting of: the unpacked code attempting to make a potentially dangerous system call, the unpacked code terminating, and the unpacked code timing out.

15. The non-transitory, processor-readable medium of claim 13, wherein the packed code is packed in accordance with a code-altering technique selected from the group consisting of: encryption, packing algorithms, compression techniques, weak encryption and file repackaging.

16. The non-transitory, processor-readable medium of claim 13, further comprising instructions for altering selected functions so the unpacked code is unable to access code of the selected functions.

17. The method of claim 1, further comprising:
determining whether to stop the pestware process, unload the pestware process, or refer the pestware process to the actual function depending on the type of the call the pestware process attempts to make.

18. The system of claim 10, wherein the loader module determines whether to stop the pestware process, unload the pestware process, or refer the pestware process to the actual function depending on the type of the call the pestware process attempts to make.

19. The non-transitory, processor-readable medium of claim 13, further comprising instructions for determining whether to stop the pestware process, unload the pestware process, or refer the pestware process to the actual function depending on the type of the call the pestware process attempts to make.

* * * * *